US010492500B1

(12) United States Patent
Siwak et al.

(10) Patent No.: US 10,492,500 B1
(45) Date of Patent: Dec. 3, 2019

(54) DISPENSING BAKED GOOD CONTAINER ASSEMBLY AND METHOD

(71) Applicants: Samuel Siwak, Clayton, MO (US);
Benjamin Siwak, Clayton, MO (US);
Molly Siwak, Clayton, MO (US)

(72) Inventors: Samuel Siwak, Clayton, MO (US);
Benjamin Siwak, Clayton, MO (US);
Molly Siwak, Clayton, MO (US)

(*) Notice: Subject to any disclaimer, the term of this patent is extended or adjusted under 35 U.S.C. 154(b) by 0 days.

(21) Appl. No.: 16/118,797

(22) Filed: Aug. 31, 2018

(51) Int. Cl.
A21C 15/00 (2006.01)
A47J 47/01 (2006.01)
B65D 1/32 (2006.01)
B65D 35/38 (2006.01)
B65D 83/00 (2006.01)
A23G 3/28 (2006.01)
B65D 75/58 (2006.01)

(52) U.S. Cl.
CPC .............. *A21C 15/005* (2013.01); *A47J 47/01* (2013.01); *B65D 1/32* (2013.01); *B65D 83/0055* (2013.01); *A23G 3/28* (2013.01); *B65D 35/38* (2013.01); *B65D 75/5866* (2013.01)

(58) Field of Classification Search
CPC .......... A21C 15/005; A47J 47/01; B65D 1/32; B65D 83/0055; B65D 35/38; B65D 75/5866; A23G 3/28
USPC .......... 222/95, 566, 567, 568, 570; 206/221; 426/112, 115, 128, 516, 519, 410–411, 426/416
See application file for complete search history.

(56) References Cited

U.S. PATENT DOCUMENTS

| 2,110,615 | A | * | 3/1938 | Wilcox | B65D 83/005 206/525 |
| 2,157,476 | A | * | 5/1939 | Brodesser | B65D 83/0072 206/525 |
| 2,200,200 | A | * | 5/1940 | Donnelly | B65D 3/22 229/117.3 |
| 2,338,604 | A | * | 1/1944 | Silveyra | B65D 25/16 229/117.3 |
| 2,352,503 | A | * | 6/1944 | Walton | B65D 5/5059 53/173 |
| 2,546,137 | A | * | 3/1951 | Schmidt | B31B 50/00 493/100 |

(Continued)

FOREIGN PATENT DOCUMENTS

| CA | 1305891 C | 8/1992 |
| CN | 101934890 A | 1/2011 |

(Continued)

*Primary Examiner* — Patrick M. Buechner
*Assistant Examiner* — Michael J. Melaragno
(74) *Attorney, Agent, or Firm* — Jay J. Hoette; The Small Patent Law Group, LLC

(57) ABSTRACT

A dispensing baked good container assembly includes a container having a top and a bottom and having a cavity configured to hold baked good ingredients and configured to be opened. The dispensing baked good container assembly includes a pastry bag coupled to the container. The pastry bag is initially packed in the container and is configured to be contained in the cavity. The pastry bag is configured to be deployed after the container is opened. The pastry bag is open to the container such that items are configured to be passed from the cavity of the container into the pastry bag after being deployed for mixing and dispensing of the baked good ingredients from the pastry bag.

50 Claims, 6 Drawing Sheets

(56) References Cited

U.S. PATENT DOCUMENTS

| | | | | |
|---|---|---|---|---|
| 2,550,034 A * | 4/1951 | Allen | A61J 9/005 | 215/11.3 |
| 2,753,081 A * | 7/1956 | Hobson | B65D 25/16 | 222/95 |
| 2,798,813 A * | 7/1957 | Patterson | A23L 9/12 | 426/553 |
| 2,800,269 A * | 7/1957 | Smith | B65D 31/145 | 383/38 |
| 2,863,305 A * | 12/1958 | Shepherd | C09K 5/00 | 62/530 |
| 2,885,104 A * | 5/1959 | Greenspan | A61J 1/2093 | 206/222 |
| 2,893,547 A * | 7/1959 | Earl | B65D 81/3261 | 206/219 |
| 3,128,016 A * | 4/1964 | Ferri, Jr. | B65D 1/0238 | 222/212 |
| 3,157,312 A * | 11/1964 | Kitterman | B65D 75/5883 | 222/1 |
| 3,158,110 A * | 11/1964 | Ross | A23G 3/28 | 425/458 |
| 3,163,544 A * | 12/1964 | Valyi | B65D 25/02 | 426/112 |
| 3,194,185 A * | 7/1965 | Spinosa | A21C 3/021 | 426/556 |
| 3,195,785 A * | 7/1965 | Oram | B65D 51/28 | 222/183 |
| 3,223,289 A * | 12/1965 | Bouet | A45D 40/00 | 222/209 |
| 3,227,308 A * | 1/1966 | Frankenberg | B65D 25/34 | 222/1 |
| 3,240,416 A * | 3/1966 | Deegan | B65D 77/064 | 229/242 |
| 3,289,827 A * | 12/1966 | Frankenberg | B65D 83/00 | 206/216 |
| 33,337,039 | 8/1967 | Knittel et al. | | |
| 3,407,968 A * | 10/1968 | Fiquet | B65D 35/28 | 222/104 |
| 3,414,165 A * | 12/1968 | Goodenow | B65D 25/42 | 222/82 |
| 3,430,815 A * | 3/1969 | Weimer | B65D 77/064 | 222/99 |
| 3,521,754 A * | 7/1970 | Ireland | B44D 3/10 | 210/359 |
| 3,550,803 A * | 12/1970 | Pelli | B65D 77/0493 | 215/12.1 |
| 3,784,039 A * | 1/1974 | Marco | A61J 9/001 | 215/11.3 |
| 4,098,434 A * | 7/1978 | Uhlig | B65D 83/0055 | 222/105 |
| 4,205,765 A * | 6/1980 | May | A21C 15/005 | 222/107 |
| 4,267,928 A * | 5/1981 | Curry, Jr. | A23B 4/00 | 206/497 |
| 4,397,879 A * | 8/1983 | Wilson | A47J 43/28 | 220/266 |
| 4,402,402 A * | 9/1983 | Pike | B65D 81/3266 | 206/219 |
| 4,452,823 A * | 6/1984 | Connolly | A23G 3/28 | 222/99 |
| 4,560,085 A * | 12/1985 | vom Hofe | B29C 49/24 | 220/495.08 |
| 4,572,386 A * | 2/1986 | Marcus | B65D 47/061 | 206/508 |
| 4,574,987 A * | 3/1986 | Halligan | A23G 9/44 | 222/107 |
| 4,793,324 A * | 12/1988 | Caferro | A21B 1/02 | 126/369 |
| 4,805,799 A * | 2/1989 | Robbins, III | B65D 25/16 | 220/495.04 |
| 4,842,165 A * | 6/1989 | Van Coney | B65D 47/2018 | 222/105 |
| 4,875,508 A * | 10/1989 | Burke, II | B65D 83/0055 | 141/2 |
| 4,907,724 A * | 3/1990 | Wing, Jr. | B65D 77/065 | 206/525 |
| 4,917,081 A * | 4/1990 | Bartos | A62B 7/10 | 128/205.12 |
| 4,925,055 A * | 5/1990 | Robbins, III | A61J 1/05 | 215/12.1 |
| 4,930,644 A * | 6/1990 | Robbins, III | B65D 1/02 | 215/382 |
| 4,966,537 A * | 10/1990 | Bowles | A23G 3/28 | 222/323 |
| 4,991,742 A * | 2/1991 | Chang | A61M 5/148 | 222/105 |
| 5,226,551 A * | 7/1993 | Robbins, III | B65D 1/0292 | 220/8 |
| 5,287,961 A * | 2/1994 | Herran | B65D 81/3266 | 206/219 |
| 5,384,139 A * | 1/1995 | Vasseneix | A21D 10/002 | 206/219 |
| 5,390,587 A * | 2/1995 | Wu | E03C 1/046 | 210/449 |
| 5,422,129 A * | 6/1995 | Draddy | B65D 21/08 | 215/10 |
| 5,538,050 A * | 7/1996 | Galdon | B65B 67/12 | 141/10 |
| 5,549,213 A * | 8/1996 | Robbins, III | A47G 23/0241 | 215/329 |
| 5,575,398 A * | 11/1996 | Robbins, III | A47G 23/0241 | 215/354 |
| 5,618,105 A * | 4/1997 | Baker | A61C 9/0026 | 206/221 |
| 5,638,968 A * | 6/1997 | Baron | A61J 9/00 | 206/221 |
| 5,711,445 A * | 1/1998 | Robbins, III | A47G 23/0241 | 215/384 |
| 5,758,802 A * | 6/1998 | Wallays | A21C 15/005 | 222/212 |
| 5,860,556 A * | 1/1999 | Robbins, III | B65D 1/0292 | 220/608 |
| 5,899,049 A * | 5/1999 | Fuss | B65B 9/15 | 53/261 |
| 5,900,293 A * | 5/1999 | Zettle | B29C 49/04 | 220/666 |
| 6,013,294 A * | 1/2000 | Bunke | A21D 10/002 | 426/120 |
| 6,050,432 A * | 4/2000 | Koehnke | A61J 9/001 | 215/11.3 |
| 6,060,088 A * | 5/2000 | Akimoto | A21D 8/06 | 426/113 |
| 6,179,165 B1 * | 1/2001 | Knight | A21C 15/005 | 222/107 |
| 6,244,433 B1 * | 6/2001 | Vieu | B65D 81/3211 | 206/221 |
| 6,261,613 B1 * | 7/2001 | Narayanaswamy | A21D 6/001 | 426/128 |
| 6,478,190 B2 * | 11/2002 | Kuge | B65D 35/10 | 222/107 |
| 6,520,070 B1 * | 2/2003 | Heczko | A23L 2/00 | 426/113 |
| 6,598,764 B1 * | 7/2003 | Stern | B05C 17/00583 | 222/105 |
| 6,601,732 B1 * | 8/2003 | Rooney | B32B 27/06 | 222/107 |
| 6,622,615 B2 * | 9/2003 | Heczko | A23L 2/00 | 426/113 |
| 6,951,275 B2 * | 10/2005 | Serra Galdos | B65D 25/082 | 206/221 |
| 6,981,614 B2 * | 1/2006 | Niggemyer | B65D 75/5883 | 222/107 |
| 7,303,086 B2 * | 12/2007 | Nhan | A61J 9/001 | 215/11.1 |
| 7,337,923 B2 * | 3/2008 | Niggemyer | B65D 1/0246 | 222/107 |
| 7,478,736 B2 * | 1/2009 | Morgan | B65D 35/38 | 222/107 |

(56) References Cited

U.S. PATENT DOCUMENTS

| | | | |
|---|---|---|---|
| 7,763,296 B2* | 7/2010 | Stimson | A21D 13/40 426/115 |
| 7,992,735 B2* | 8/2011 | Bullard | B65D 81/3222 206/221 |
| 8,201,709 B1* | 6/2012 | Namigata | A21C 15/005 222/105 |
| 8,365,941 B2* | 2/2013 | Mayer | A45F 3/18 206/217 |
| 8,597,702 B1* | 12/2013 | Akimoto | A21D 10/025 426/113 |
| 8,960,502 B2* | 2/2015 | Stehli, Jr. | B65D 83/0055 222/105 |
| 9,522,405 B2* | 12/2016 | Stehli, Jr. | B65D 83/0055 |
| 9,950,827 B1* | 4/2018 | Lau | B65D 1/04 |
| 2001/0042757 A1* | 11/2001 | Kuge | B65D 35/10 222/95 |
| 2003/0080149 A1* | 5/2003 | Famiglietti | B65D 31/18 222/103 |
| 2004/0159673 A1* | 8/2004 | Hennessey | B65D 83/0055 222/105 |
| 2006/0065132 A1* | 3/2006 | Jongen | B65D 83/0055 99/485 |
| 2007/0275131 A1* | 11/2007 | Bertini | A23G 9/00 426/115 |
| 2008/0041878 A1* | 2/2008 | Day | A21C 15/005 222/95 |
| 2009/0130261 A1* | 5/2009 | Rich | B65D 85/816 426/66 |
| 2009/0178940 A1* | 7/2009 | Said | A61J 9/00 206/221 |
| 2011/0220652 A1* | 9/2011 | Corbett | B65D 77/06 220/495.03 |
| 2012/0006849 A1* | 1/2012 | Folkmar | A21O 15/005 222/107 |
| 2012/0207886 A1* | 8/2012 | Shulevitz | A21D 6/001 426/115 |
| 2012/0231115 A1* | 9/2012 | Bloir | A21D 10/005 426/21 |
| 2013/0277392 A1* | 10/2013 | Dominguez | B65D 75/5811 222/107 |
| 2014/0053945 A1* | 2/2014 | Albritton | B67C 11/02 141/1 |
| 2015/0253312 A1* | 9/2015 | Awdeh | C12Q 1/04 436/164 |
| 2015/0307236 A1* | 10/2015 | Bellmore | B65D 75/5883 222/95 |
| 2015/0375905 A1* | 12/2015 | Caunant | A23L 27/00 53/456 |
| 2018/0116244 A1* | 5/2018 | Takakuta | A23G 3/28 |
| 2019/0185218 A1* | 6/2019 | Viancin | B65D 35/38 |

FOREIGN PATENT DOCUMENTS

| | | |
|---|---|---|
| EP | 0113327 A2 | 7/1984 |
| EP | 0820234 B1 | 7/2000 |
| EP | 3165095 A1 | 5/2017 |
| GB | 796499 A | 6/1958 |
| GB | 2227004 A | 7/1990 |
| GB | 2302640 A | 1/1997 |
| GB | 2382063 C | 11/2003 |
| WO | 94/25356 A | 11/1994 |
| WO | 9632018 A | 10/1996 |
| WO | 2016/055997 A1 | 4/2016 |

* cited by examiner

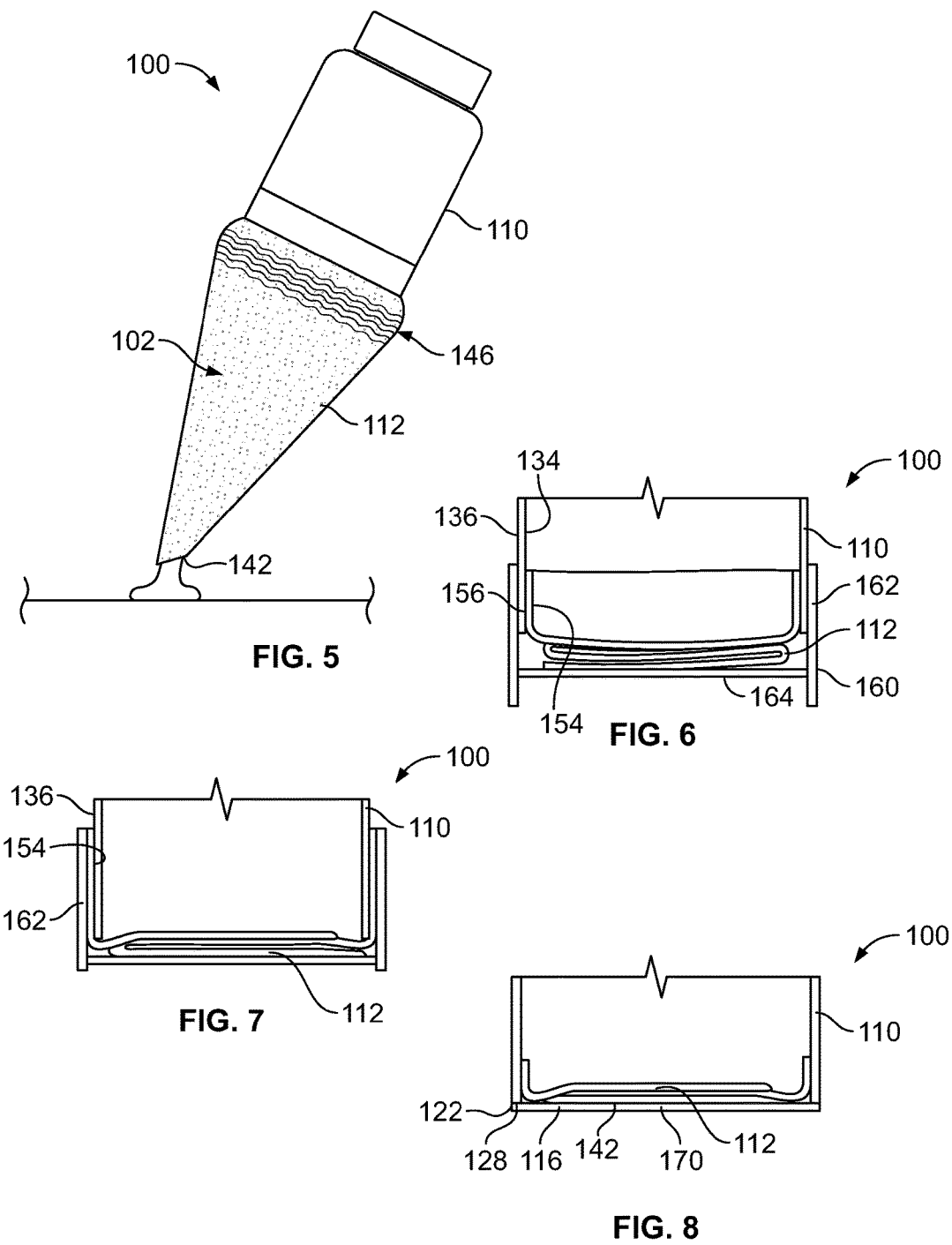

DISPENSING BAKED GOOD CONTAINER ASSEMBLY AND METHOD

BACKGROUND OF THE INVENTION

The subject matter herein relates generally to dispensing baked good container assemblies and methods.

Baked goods are typically made by dispensing dough onto a cooking sheet. However, ingredients are typically measured out individually and mixed into dough in a mixing bowl using an electric mixer or a hand mixer. Such measuring and mixing process is time consuming and messy. Some known methods include the use of pre-packaged ingredients, where the user simply pours the contents of the box or bag into the bowl and then adds water and then mixes the ingredients in the bowl. While pre-packaging saves time, the process is still messy and dirties bowls and other mixing utensils. Some known methods include the use of a pastry bag or piping bag to dispense the dough onto the baking sheet. For example, the mixed dough may be transferred into the pastry bag. It may be difficult to transfer the dough into the pastry bag. Additionally, such techniques require having the pastry bag available on hand when baking to utilize.

A need remains for a dispensing baked good container that may be manufactured in a cost effective and reliable manner and that is easy to use.

BRIEF DESCRIPTION OF THE INVENTION

In one embodiment, a dispensing baked good container assembly is provided including a container having a top and a bottom and having a cavity configured to hold baked good ingredients and configured to be opened. The dispensing baked good container assembly includes a pastry bag coupled to the container. The pastry bag is initially packed in the container and is configured to be contained in the cavity. The pastry bag is configured to be deployed after the container is opened. The pastry bag is open to the container such that items are configured to be passed from the cavity of the container into the pastry bag after being deployed for mixing and dispensing of the baked good ingredients from the pastry bag.

In another embodiment, a dispensing baked good container assembly is provided including a container having a top and a bottom and having a cavity configured to hold baked good ingredients. The container is configured to be opened. A lid is provided at the top of the container configured to be opened to access the cavity. A base is removably coupled to the bottom of the container. A pastry bag is coupled to the container. The pastry bag is initially packed in the bottom of the container and is configured to be contained below the baked good ingredients. The pastry bag is configured to be deployed after the base is removed. The pastry bag is open to the container such that the baked good ingredients are configured to be transferred from the cavity of the container into the pastry bag through the bottom of the container after the pastry bag is deployed for mixing and dispensing of the baked good ingredients from the pastry bag.

In a further embodiment, a method of manufacturing a dispensing baked good container assembly is provided including providing a container having a cavity configured to hold baked good ingredients, coupling a pastry bag to a bottom of the container, and packing the pastry bag into the container such that the cavity is configured to receive the baked good ingredients and the packed pastry bag. The pastry bag is configured to be deployed below the container to receive the baked good ingredients for mixing and dispensing of the baked good ingredients from the pastry bag.

In another embodiment, a method of manufacturing a dispensing baked good container assembly is provided including loading baked good ingredients into a cavity of a container on top of a packed pastry bag located at the bottom of the container, wherein at least some of the baked good ingredients are loaded into the container. The method includes sealing the container with the baked good ingredients in the cavity on top of the packed pastry bag. The container is configured to be unsealed to deploy the pastry bag in such a way that the ingredients are configured to be transferred directly from the cavity into the deployed pastry bag for mixing and dispensing of the baked good ingredients from the pastry bag.

In a further embodiment, a method is provided of dispensing baked good ingredients from a dispensing baked good container assembly that includes a container having a cavity holding baked good ingredients and a pastry bag coupled to the container at the bottom of the container and being initially packed in the bottom of the container. The method includes removing a base from the container to expose the packed pastry bag, deploying the pastry bag below the container, emptying the baked good ingredients from the cavity with the attached pastry bag, mixing the baked good ingredients in the pastry bag, and dispensing the baked good ingredients from the pastry bag.

In another embodiment, a dispensing baked good container assembly is provided including a container having a top and a bottom and having a cavity configured to hold baked good ingredients. The container is configured to be opened. A lid is provided at the top of the base configured to be opened to access the cavity. A base is removably coupled to the top of the container. A pastry bag is coupled to the container. The pastry bag is initially packed in the top of the container and is configured to be contained above the baked good ingredients. The pastry bag is configured to be deployed after the lid is removed. The pastry bag is open to the container such that the baked good ingredients are configured to be transferred from the cavity of the container into the pastry bag through the top of the container after the pastry bag is deployed for mixing and dispensing of the baked good ingredients from the pastry bag.

In a further embodiment, a method of manufacturing a dispensing baked good container assembly is provided including providing a container having a cavity configured to hold baked good ingredients, coupling a pastry bag to a top of the container, and packing the pastry bag into the container such that the cavity is configured to receive the baked good ingredients and the packed pastry bag. The pastry bag is configured to be deployed above the container to receive the baked good ingredients for mixing and dispensing of the baked good ingredients from the pastry bag.

In another embodiment, a method of manufacturing a dispensing baked good container assembly is provided including loading baked good ingredients into a cavity of a container under a packed pastry bag located at the top of the container, wherein at least some of the baked good ingredients are loaded into the container. The method includes sealing the container with the baked good ingredients in the cavity under the packed pastry bag. The container is configured to be unsealed to deploy the pastry bag in such a way that the ingredients are configured to be transferred directly from the cavity into the deployed pastry bag for mixing and dispensing of the baked good ingredients from the pastry bag.

In a further embodiment, a method is provided of dispensing baked good ingredients from a dispensing baked good container assembly that includes a container having a cavity holding baked good ingredients and a pastry bag coupled to the container at the top of the container and being initially packed in the top of the container. The method includes removing a lid from the container to expose the packed pastry bag, deploying the pastry bag above the container, emptying the baked good ingredients from the cavity with the attached pastry bag, mixing the baked good ingredients in the pastry bag, and dispensing the baked good ingredients from the pastry bag.

BRIEF DESCRIPTION OF THE DRAWINGS

FIG. 5 illustrates the dispensing baked good container assembly in accordance with an exemplary embodiment showing the container assembly being used to dispense baked good ingredients.

FIG. 6 is a cross-sectional view of a portion of the dispensing baked good container assembly showing the pastry bag coupled to the container in accordance with an exemplary embodiment.

FIG. 7 is a cross-sectional view of a portion of the dispensing baked good container assembly showing the pastry bag coupled to the container in accordance with an exemplary embodiment.

FIG. 8 is a cross-sectional view of a portion of the dispensing baked good container assembly.

DETAILED DESCRIPTION OF THE INVENTION

Figure 1:
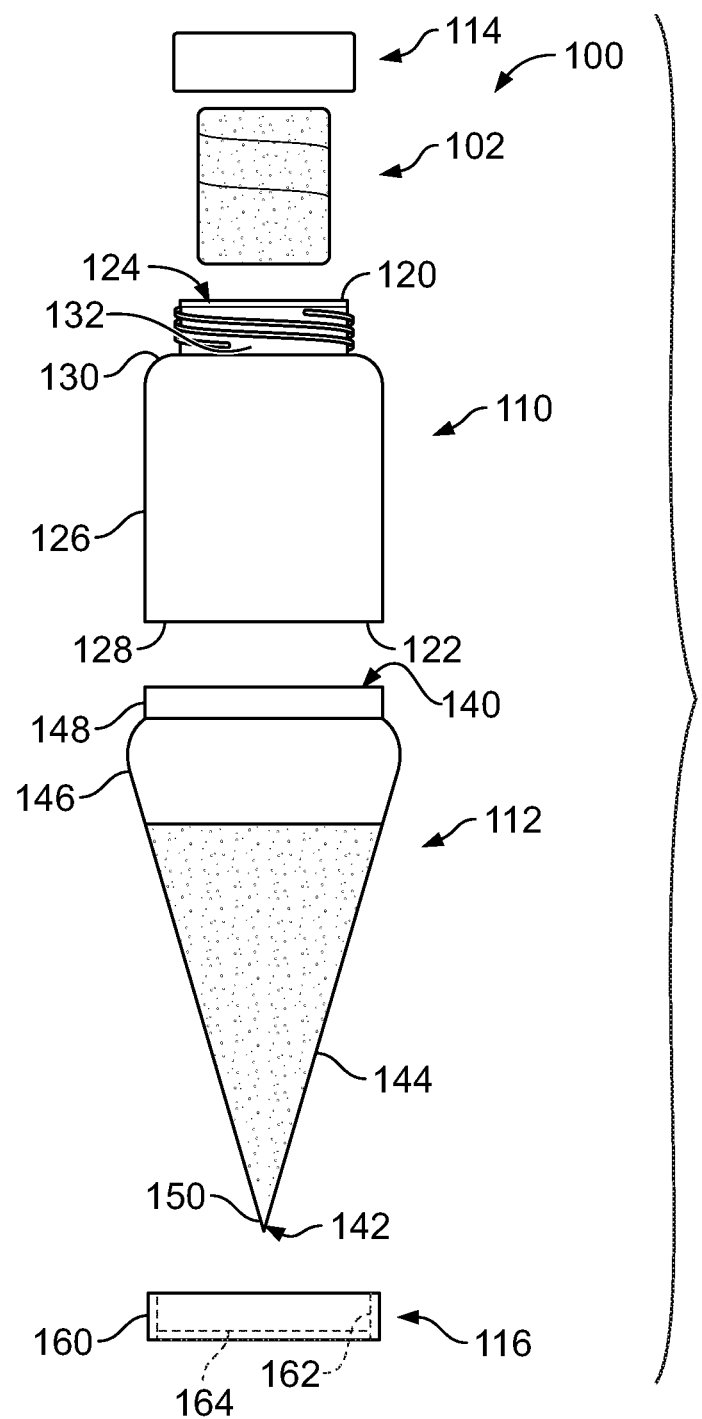
FIG. 1 is an exploded view of a dispensing baked good container assembly in accordance with an exemplary embodiment.

FIG. 1 is an exploded view of a dispensing baked good container assembly 100 in accordance with an exemplary embodiment. The dispensing baked good container assembly 100 may be referred to hereinafter as a container assembly 100. The container assembly 100 is used for dispensing baked good ingredients 102 for baking, such as cookies, pet treats, and the like. The container assembly 100 provides a package that holds the baked good ingredients 102 from manufacturer to consumer. The container assembly 100 provides a structure for mixing and dispensing of the baked good ingredients 102. The container assembly 100 provides an easy baking experience for adults and children alike.

The container assembly 100 includes a container 110 and a pastry bag 112 integrated with the container 110. In an exemplary embodiment, the container assembly 100 includes a lid 114 and a base 116. The lid 114 is removable. In an exemplary embodiment, the base 116 is removable to access the pastry bag 112. The container 110 initially holds the baked good ingredients 102 and the pastry bag 112. For example, the baked good ingredients 102 and the pastry bag 112 are loaded in the container 110 as a package that may be sold on a shelf at a retail marketplace. When the customer is ready to use the container assembly 100 and bake the baked goods, the pastry bag 112 is deployed from the container 110 and the baked good ingredients 102 are transferred to the pastry bag 112 for mixing and dispensing of the baked good ingredients from the pastry bag 112.

The container 110 extends between a top 120 and a bottom 122. The container 110 has a cavity 124 that holds the baked good ingredients 102 and may hold the pastry bag 112 when the pastry bag 112 is packed in the container 110. The container 110 includes sides 126 between the top 120 and the bottom 122. In the illustrated embodiment, the sides 126 define an edge 128 at the bottom 122. Optionally, the container 110 may have shoulders 130 at the top 120 leading to a neck 132. The lid 114 is coupled to the neck 132 at the top 120. Optionally, the neck 132 may be threaded and the lid 114 may be threadably coupled to the neck 132. In various embodiments, the bottom 122 may additionally or alternatively include a neck (not shown) and the neck may be threaded such as for threadably coupling the base 116 to such neck at the bottom 122. Alternatively, the base 116 may be coupled to the bottom 122 at the edge 128 and/or to the sides 126 proximate to the bottom 122.

In an exemplary embodiment, the container 110 is rigid and retains shape. For example, the container 110 may be manufactured from a plastic material, such as polyethylene terephthalate (PET) or other polymer material. The container 110 may be molded, extruded, or otherwise formed into an appropriate shape. In various embodiments, the container 110 may have a generally cylindrical shape; however, the container 110 may have other appropriate shapes. In alternative embodiments, the container 110 may be flexible, such as a bag or other flexible packaging material. Optionally, the flexible container may be self-standing on the base 116, which may be integrated with the sides 126 of the container 110 as opposed to being a separate, discrete component.

The pastry bag 112 extends between a top 140 and a bottom 142. The pastry bag 112 is generally conical shaped tapering at the bottom 142. For example, the pastry bag 112 has a conical section 144 at a lower end of the pastry bag 112. The conical section 144 receives the baked good ingredients 102 and the baked good ingredients 102 are dispensed from the conical section 144. In the illustrated embodiment, the pastry bag 112 has a bulbed section 148 above the conical section 144 and a necked section 148 above the bulbed section 146. However, in alternative embodiments, the entire pastry bag 112 may have a conical shape.

The necked section 148 is configured to be coupled to the container 110. The necked section 148 has an opening 152 at the top 140 of the pastry bag that is configured to receive the baked good ingredients 102 through the bottom 122 of the container 110. In various embodiments, the necked section 148 may have a size and shape approximately equal to the size and shape of the bottom 122 of the container 110 for attaching the pastry bag 112 to the container 110. For example, the necked section 148 may have a diameter approximately equal to the diameter of the bottom 122 of the container 110. In various embodiments, the necked section 148 may be cylindrical having a uniform diameter between the top and the bottom of the next section 148. The necked section 148 is narrower than the bulbed section 146.

The bulbed section 146 is configured to be located below the container 110. In an exemplary embodiment, the bulbed section 146 has a non-uniform diameter. For example, the bulbed section 146 may be narrower at the top and narrower at the bottom wall being wider in the middle of the bulbed section 146. Other shapes are possible in alternative embodiments. In an exemplary embodiment, the bulbed section 146 is wider than the conical section 144 and the bulbed section 146 is wider than the necked section 148. The bulbed section 146 is an enlarged area that allows the pastry bag 112 to be gathered and/or twisted when dispensing the baked good ingredients 102. For example, the extra material in the bulbed section 146 allows the pastry bag 112 to be twisted at the bulbed section 146 below the container 110 without putting undue stress and strain on the necked section 148 and the connection between the necked section 148 and the container 110. When the pastry bag 112 is twisted at the bulbed section 146, the twisted area of the pastry bag 112 at the bulbed section 146 may be approximately equal to the area of the container 110.

The conical section 144 has a decreasing diameter from the top to the bottom 142. The conical section 144 extends to a tip 150 at the bottom 142. The tip 150 may be removed by cutting off the bottom 142 of the pastry bag 112 to form an opening at the bottom 142 for dispensing the baked good ingredients 102. Optionally, a decorating tip or other type of nozzle may be coupled to the bottom 142 of the pastry bag 112 for dispensing the baked good ingredients 102.

In an exemplary embodiment, the base 116 includes a molded cap 160 configured to be coupled to the container 110 at the bottom 122. The molded cap 160 includes a sidewall 162 and a removable bottom wall 164. In various embodiments, the bottom wall 164 is sealed to the side wall 162 such that the cavity 124 of the container 110 is sealed. For example, the bottom wall 164 may be a removable foil seal that may be pulled off from the bottom of the molded cap 160. Optionally, only a portion of the bottom wall 164 may be removable. For example, the bottom wall 164 may include an opening covered by a removable foil seal. When assembled, the sidewall 162 may be secured to the side 126 of the container 110. For example, the sidewall 162 may be adhered to the side 126. Other types of bases 116 may be used in alternative embodiments other than molded caps 160. For example, in various embodiments, rather than using a molded cap having sidewalls, the base 116 may be defined by a foil seal coupled directly to the edge 128 at the bottom 122 of the container 110. In other various embodiments, the base 116 may be a threaded lid that is screwed onto and off of the bottom 122 of the container 110.

In an exemplary embodiment, the pastry bag 112 is configured to be packaged and contained in the molded cap 160. For example, the pastry bag 112 may be folded up inside the molded cap 160 and thus located at the bottom 122 of the container 110. The pastry bag 112 may be coupled to the bottom wall 164 and pulled out of the container 110 when the bottom wall 164 is removed. For example, the bottom 142 of the pastry bag 112 may be coupled to the bottom wall 164 and the top 140 of the pastry bag 112 may be coupled to the container 110. When the bottom wall 164 is removed, the bottom 142 of the pastry bag 112 is pulled out of the container 110, while the top 140 of the pastry bag 112 remains coupled to the container 110.

Figure 2:
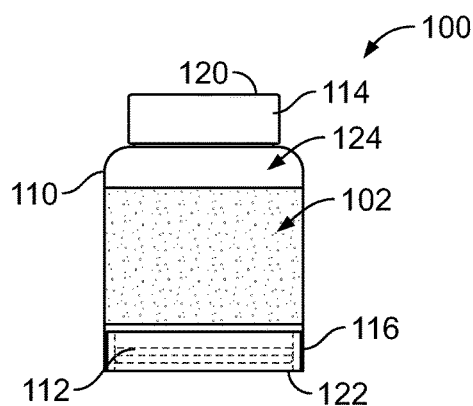
FIG. 2 illustrates the dispensing baked good container assembly in accordance with an exemplary embodiment with a pastry bag and baked good ingredients packed in a container.

FIG. 2 illustrates the dispensing baked good container assembly 100 in accordance with an exemplary embodiment with the pastry bag 112 and the baked good ingredients 102 packed in the container 110. When manufacturing the container assembly 100, the container 110 is provided. The pastry bag 112 is coupled to the bottom 122 of the container 110. For example, the pastry bag 112 may be coupled to the bottom 122 with the base 116.

During assembly, the pastry bag 112 is packed into the bottom of the container 110 such that the cavity 124 of the container 110 is able to receive the baked good ingredients 102 on top of the packed pastry bag 112. For example, the pastry bag 112 may be folded up at the bottom 122. The baked good ingredients 102 are loaded into the cavity 124 of the container 110 on top of the packed pastry bag 112. In other various embodiments, the baked good ingredients 102 may be pre-loaded in the pastry bag 112 in the container 110 rather than being loaded on top of the packed pastry bag 112. For example, the pastry bag 112 may be pre-filled, and optionally sealed in the pastry bag 112, prior to being loaded into the container 110 and coupled thereto. The container 110 may be sealed, such as with a removable foil (not shown) at the top 120 and/or with the lid 114. The container 110 is configured to be opened at the top 120 and/or the bottom 122. For example, the base 116 may be removed to deploy the pastry bag 112 below the container 110. When the pastry bag 112 is deployed, the baked good ingredients 102 may be transferred into the pastry bag 112 from the container 110.

Figure 3:
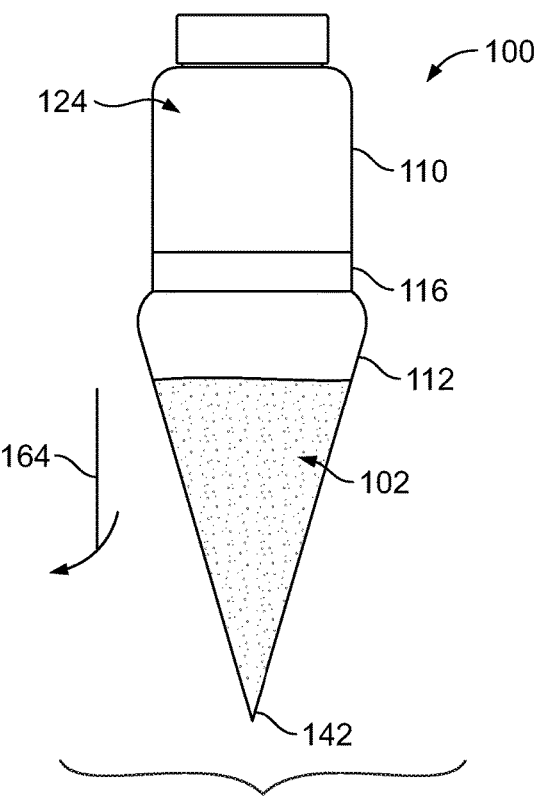
FIG. 3 illustrates the dispensing baked good container assembly in accordance with an exemplary embodiment with the pastry bag deployed below the container and the baked good ingredients in the pastry bag.

FIG. 3 illustrates the dispensing baked good container assembly 100 in accordance with an exemplary embodiment with the pastry bag 112 deployed below the container 110 and the baked good ingredients 102 in the pastry bag 112. The container 110 is configured to be unsealed, such as by removing at least a portion of the base 116 (for example, the bottom wall 164), to deploy the pastry bag 112. When the base 116 is removed, the pastry bag 112 may be unpacked from the container 110. For example, the bottom 142 of the pastry bag 112 may be pulled downward to deploy the pastry bag 112. The pastry bag 112 is open to the cavity 124 of the container 110 to receive the baked good ingredients 102 directly from the cavity 124. For example, the baked good ingredients 102 may simply fall into the deployed pastry bag 112 from the cavity 124. Optionally, the weight of the baked good ingredients 102 on top of the pastry bag 112 may cause the pastry bag 112 to deploy as the baked good ingredients 102 fill the pastry bag 112. As such, the ingredients 102 may be automatically transferred into the pastry bag 112 when the base 116 is removed.

When deployed, the container 110 supports the pastry bag 112. For example, the user may hold the container 110 to support the pastry bag 112 and the baked good ingredients 102. The pastry bag 112 remains coupled to the container 110 during mixing and dispensing of the baked good ingredients 102 from the pastry bag 112.

Figure 4:
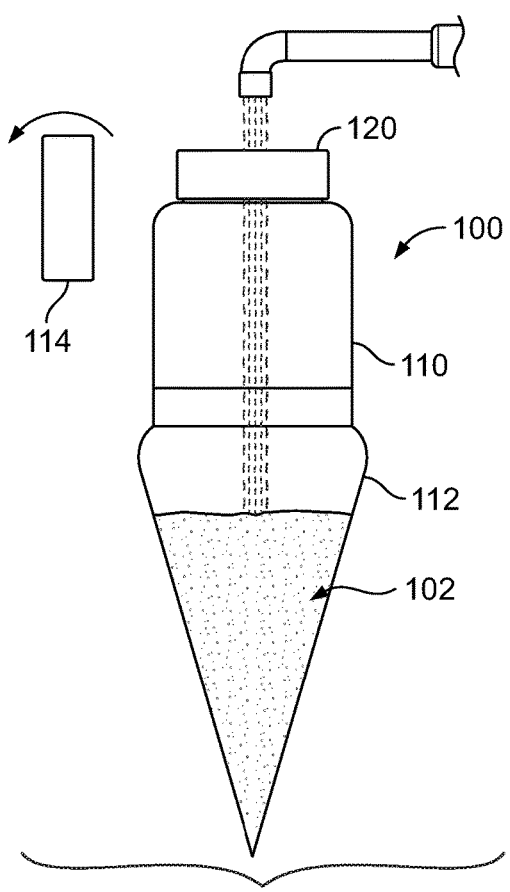
FIG. 4 illustrates the dispensing baked good container assembly in accordance with an exemplary embodiment.

FIG. 4 illustrates the dispensing baked good container assembly 100 in accordance with an exemplary embodiment. FIG. 4 illustrates the lid 114 removed from the container 110. Liquid, such as water, milk or other liquid may be poured into the container assembly 100 through the open top 120 of the container 110. The liquid is poured into the pastry bag 112 through the container 110. The container 110 may funnel the liquid into the pastry bag 112. The baked good ingredients 102 and the liquid are configured to be mixed by massaging the ingredients 102 by hand in the pastry bag 112 into dough that may be dispensed from the pastry bag 112.

FIG. 5 illustrates the dispensing baked good container assembly 100 in accordance with an exemplary embodiment showing the container assembly 100 being used to dispense the baked good ingredients 102. The bottom 142 of the pastry bag 112 has been opened to allow the baked good ingredients 102 to be dispensed from the bottom 142 of the pastry bag 112. The pastry bag 112 may be twisted at the top to close the top of the pastry bag 112 and force the baked good ingredients 102 from the bottom 142. For example, the pastry bag 112 may be twisted immediately below the container 110, such as at the bulbed section 146, which forms a twisted section that compresses against the baked good ingredients 102 in the bottom of the pastry bag 112.

FIG. 6 is a cross-sectional view of a portion of the dispensing baked good container assembly 100 showing the pastry bag 112 coupled to the container 110 in accordance with an exemplary embodiment. In an exemplary embodiment, the container 110 includes an interior surface 134 and an exterior surface 136. The pastry bag 112 includes an interior surface 154 and an exterior surface 156. In the illustrated embodiment, the pastry bag 112 is located inside the container 110. For example, the exterior surface 156 of the pastry bag 112 is coupled to the interior surface 134 of the container 110. The pastry bag 112 may be adhered to the interior surface 134 of the container 110. However, the pastry bag 112 may be coupled to the container 110 by other means or processes in alternative embodiments.

In an exemplary embodiment, the sidewall 162 of the molded cap 160 is coupled to the exterior surface 136 of the container 110. For example, the sidewall 162 may be adhered to the exterior surface 136 of the container 110. However, the sidewall 162 may be coupled to the container 110 by other means or processes in alternative embodiments. The bottom wall 164 is located below the packed pastry bag 112. The bottom wall 164 may have a pull tab to remove the bottom wall 164.

FIG. 7 is a cross-sectional view of a portion of the dispensing baked good container assembly 100 showing the pastry bag 112 coupled to the container 110 in accordance with an exemplary embodiment. In the illustrated embodiment, the pastry bag 112 is located outside of the container 110. For example, the interior surface 154 of the pastry bag 112 is coupled to the exterior surface 136 of the container 110. The pastry bag 112 may be adhered to the exterior surface 136 of the container 110. However, the pastry bag 112 may be coupled to the container 110 by other means or processes in alternative embodiments. In the illustrated embodiment, the pastry bag 112 is captured between the sidewall 162 and the exterior surface 136 of the container 110.

FIG. 8 is a cross-sectional view of a portion of the dispensing baked good container assembly 100 showing the pastry bag 112 packed in the bottom 122 of the container 110 and the base 116 coupled to the container 110 below the pastry bag 112. In the illustrated embodiment, the base 116 includes a foil seal 170 sealed to the edge 128 at the bottom 122 of the container 110. The foil seal 170 is removable from the bottom 122 of the container 110. In an exemplary embodiment, the bottom 142 of the pastry bag 112 is coupled to the foil seal 170. When the foil seal 170 is removed, the bottom 142 of the pastry bag 112 may be pulled out of the container 110 as the foil seal 170 is removed, either with the foil seal 170 or by hand once the foil seal 170 is removed. The bottom 142 may be removed from the foil seal 170, such as by ripping the foil seal 170 off of the bottom 142 of the pastry bag 112.

Figure 9:
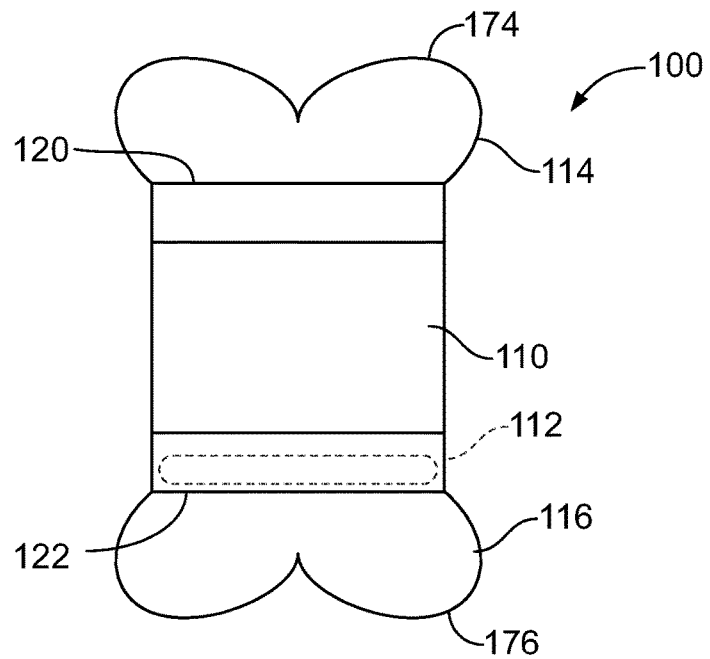
FIG. 9 is a side view of the dispensing baked good container assembly in accordance with an exemplary embodiment.

FIG. 9 is a side view of the dispensing baked good container assembly 100 in accordance with an exemplary embodiment. In the illustrated embodiment, the lid 114 and the base 116 are removable caps 174, 176, respectively. In the illustrated embodiment, the caps 174, 176 are shaped like the ends of dog bones such that the packaging of the container assembly 100 has the appearance of a dog treat or dog bone. The caps 174, 176 may have other shapes in alternative embodiments. The 176 is removed to deploy the pastry bag 112. The 174 is removable for loading the baked good ingredients 102 into the container 110 and for pouring the water into the container 110 and the pastry bag 112 after the pastry bag 112 has been deployed during the mixing process. The caps 174, 176 may be threadably coupled to the top 120 and the bottom 122 of the container 110, respectively. Alternatively, the caps 174, 176 may be secured by other means or processes, such as using adhesive, seals, fasteners, clips, shrink wrap, or other processes.

Figure 10:
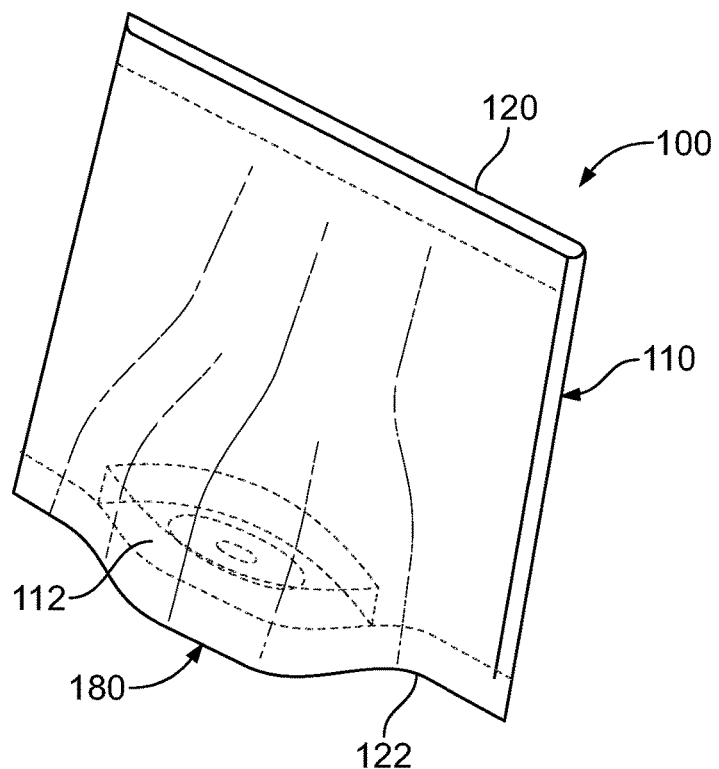
FIG. 10 is a side view of the dispensing baked good container assembly in accordance with an exemplary embodiment.

FIG. 10 is a side view of the dispensing baked good container assembly 100 in accordance with an exemplary embodiment. In the illustrated embodiment, the container 110 is a flexible container. The container 110 is a flexible bag. The flexible bag may be shaped to define a self-standing base 180. The pastry bag 112 is coupled to the container 110. In an exemplary embodiment, the container 110 is manufactured from a different material from the pastry bag 112. For example, the pastry bag 112 may be more flexible than the container 110. The container 110 may be more durable, such as for packaging, shipping, long-lasting shelf-life, and the like. The top 120 and/or the bottom 122 of the container 110 may be removable, such as having a perforated tear strip or other feature. Alternatively, the top 120 and/or the bottom 122 of the container 110 may be opened by the user using scissors or other cutting devices. The pastry bag 112 is configured to be deployed from the container 110 and is configured to remain coupled to the flexible container 110. In other various embodiments, the pastry bag 112 may be removable from the flexible container 110.

Figure 11:
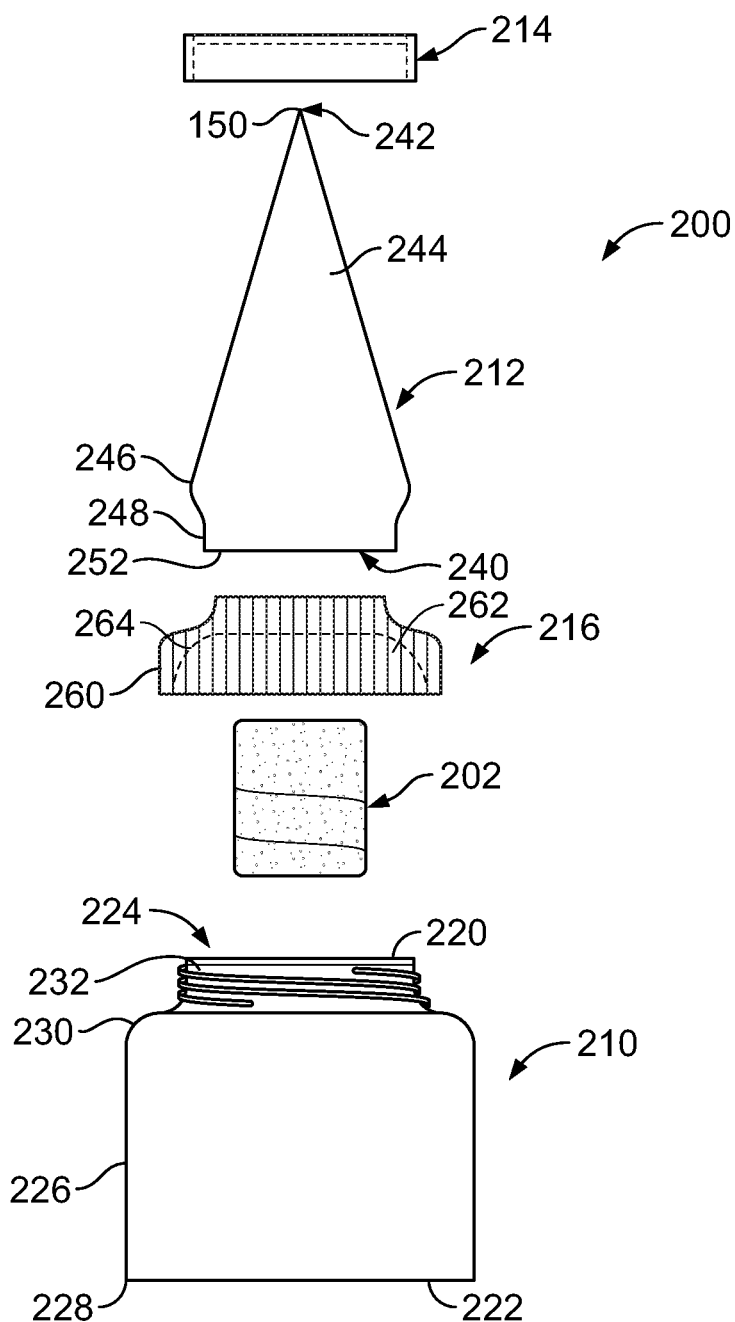
FIG. 11 is an exploded view of a dispensing baked good container assembly in accordance with an exemplary embodiment.

FIG. 11 is an exploded view of a dispensing baked good container assembly 200 in accordance with an exemplary embodiment. The dispensing baked good container assembly 200 may be referred to hereinafter as a container assembly 200. The container assembly 200 is similar to the container assembly 100; however, the container assembly 200 has a closed end and a single open end having a base (or lid) having a pastry bag at the single open side, which may be oriented at a top or a bottom of the container assembly 200 rather than being open at both ends as with the container assembly 100. The container assembly 200 is used for dispensing baked good ingredients 202 for baking, such as cookies, pet treats, and the like.

The container assembly 200 includes a container 210 and a pastry bag 212 integrated with the container 210. In an exemplary embodiment, the container assembly 200 includes a base 216. The base 216 may include a removable lid 214 coupled thereto. In an exemplary embodiment, the base 216 and/or the lid 214 are removable, such as for accessing the pastry bag 212 and/or for filling or emptying the container 210. In some instances, the container 210 is oriented such that the base 216 is at the top of the container 210 and the closed end is at the bottom of the container 210. In other instances, the container 210 is oriented such that the base 216 is at the bottom of the container 210 and the closed end is at the top of the container 210. For example, in some instances when filling and assembling the container 210, the base 216 may be at the top. In other instances when storing the container 210 on a shelf, the base 216 may be at the top. In some instances when using the container assembly 200, the base 216 may be at the bottom, such as to deploy the pastry bag 212 or empty the baked good ingredients 202 into the pastry bag 212. The baked good ingredients 202 and the pastry bag 212 are loaded in the container 210 as a package that may be sold on a shelf at a retail marketplace. When the customer is ready to use the container assembly 200 and bake the baked goods, the pastry bag 212 is deployed from the container 210 and the baked good ingredients 202 are transferred to the pastry bag 212 for mixing and dispensing of the baked good ingredients from the pastry bag 212.

The container 210 extends between a top 220 and a bottom 222. The container 210 has a cavity 224 that holds the baked good ingredients 202 and may hold the pastry bag 212 when the pastry bag 212 is packed in the container 210. The container 210 includes sides 226 between the top 220 and the bottom 222. In the illustrated embodiment, the sides 226 define an edge 228 at the bottom 222. Optionally, the container 210 may have shoulders 230 at the top 220 leading to a neck 232. The base 216 is coupled to the neck 232 at the top 220. Optionally, the neck 232 may be threaded and the base 216 may be threadably coupled to the neck 232.

In an exemplary embodiment, the container 210 is rigid and retains shape. For example, the container 210 may be manufactured from a plastic material, such as polyethylene terephthalate (PET) or other polymer material. The container 210 may be molded, extruded, or otherwise formed into an appropriate shape. In various embodiments, the container 210 may have a generally cylindrical shape; however, the container 210 may have other appropriate shapes.

The pastry bag 212 extends between a top 242 and a bottom 240. The pastry bag 212 is generally conical shaped tapering at the top 242. For example, the pastry bag 212 has a conical section 244 at an upper end of the pastry bag 212. In use, the container assembly 200 is turned upside down such that the conical section 244 receives the baked good ingredients 202 and the baked good ingredients 202 are dispensed from the conical section 244. In the illustrated embodiment, the pastry bag 212 has a bulbed section 248 below the conical section 244 and a necked section 248 below the bulbed section 246. However, in alternative embodiments, the entire pastry bag 212 may have a conical shape. In an exemplary embodiment, the necked section 248 is configured to be coupled to the base 216. The necked section 248 may be coupled to the container 210 rather than the base 216. The necked section 248 has an opening 252 that is configured to receive the baked good ingredients 202 through the top 220 of the container 210.

In an exemplary embodiment, the base 216 includes a molded cap 260 configured to be coupled to the container 210 at the top 220. In various embodiments, the lid 214 is sealed to the base 216 such that the cavity 224 of the container 210 is sealed. The lid 214 may be threadably coupled to the base 216. The lid 214 may be heat sealed or otherwise secured to the base 216.

In an exemplary embodiment, the pastry bag 212 is configured to be packaged and contained in the base 216. For example, the pastry bag 212 may be folded up inside the base 216 and thus located at the top 220 of the container 210. The pastry bag 212 may be pulled out of the container 210 when the lid 214 is removed.

Figure 12:
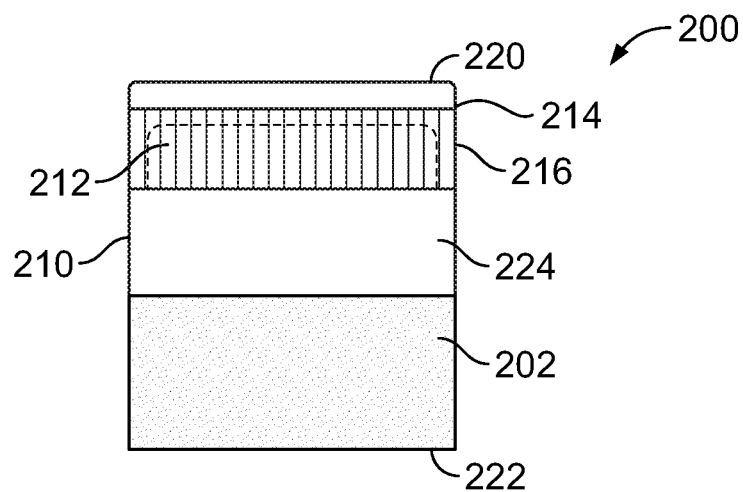
FIG. 12 illustrates the dispensing baked good container assembly in accordance with an exemplary embodiment with a pastry bag and baked good ingredients packed in a container.

FIG. 12 illustrates the dispensing baked good container assembly 200 in accordance with an exemplary embodiment with the pastry bag 212 and the baked good ingredients 202 packed in the container 210. The sidewalls and the closed bottom end of the container 210 contain the baked good ingredients 202. The base 216 and the pastry bag 212 are coupled to the open top 220 of the container 210. During shipping and storage of the container assembly 200, the container 210 rests on the closed bottom end and the base 216 is at the top. However, in other examples, the closed end may be at the top and the base 216 may be at the bottom, such as during shipping and storage on a shelf. In some instances, the base 216 is at the bottom, such as during deployment of the pastry bag 212 and dispensing of the baked good ingredients 202 from the container assembly 200. During assembly, the pastry bag 212 and the base 216 may be coupled to the container 210 after the baked good ingredients 202 are loaded into the container 210. However, in other various embodiments, the baked good ingredients 202 may be pre-loaded into the pastry bag 212 (and may be sealed in the pastry bag) and then the pastry bag 212, with the ingredients 202, is coupled to the container 210, such as with the base 216.

Figure 13:
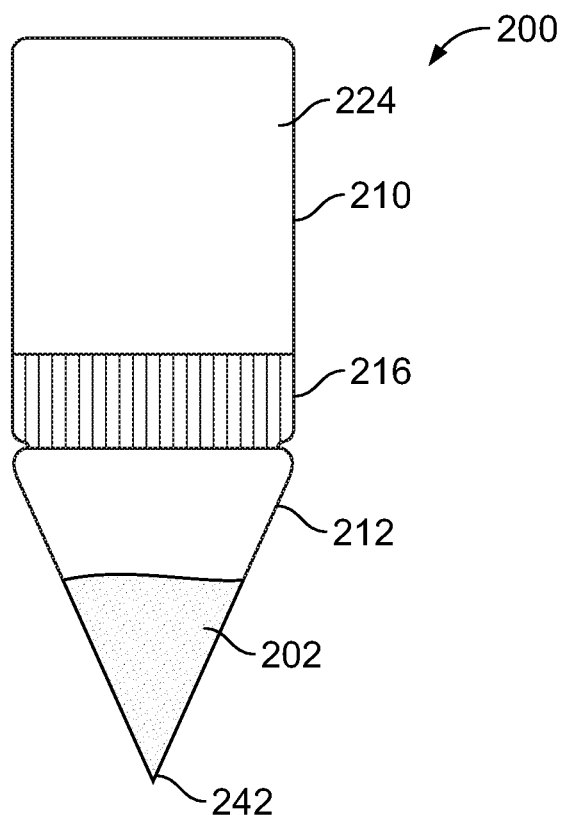
FIG. 13 illustrates the dispensing baked good container assembly in accordance with an exemplary embodiment with the container turned upside down, the pastry bag deployed from the top of the container, and the baked good ingredients in the pastry bag.

FIG. 13 illustrates the dispensing baked good container assembly 200 in accordance with an exemplary embodiment with the pastry bag 212 deployed, the container 210 turned upside down, and the baked good ingredients 202 in the pastry bag 212. The container 210 is configured to be unsealed, such as by removing at least a portion of the lid 214 and/or base 216, to deploy the pastry bag 212. When the lid 214 is removed, the pastry bag 212 may be unpacked from the container 210. For example, the pastry bag 212 may be pulled out of the base 216 to deploy the pastry bag 212. The pastry bag 212 is open to the cavity 224 of the container 210 to receive the baked good ingredients 202 directly from the cavity 224 (or may already contain the ingredients 202 within the container 210). For example, the baked good ingredients 202 may simply fall into the deployed pastry bag 212 from the cavity 224 when the container 210 is turned upside down.

When deployed, the container 210 supports the pastry bag 212. For example, the user may hold the container 210 to support the pastry bag 212 and the baked good ingredients 202. The pastry bag 212 remains coupled to the container 210, such as to the base 216, during mixing and dispensing of the baked good ingredients 202 from the pastry bag 212.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A dispensing baked good container assembly comprising:
    a container having a first end and a second end, the container having a cavity configured to hold baked good ingredients, the container configured to be opened; and
    a pastry bag coupled to the container, the pastry bag being initially packed in the container and configured to be contained in the cavity, the pastry bag configured to be deployed below the container after the container is opened, the pastry bag being open to the container such that items are configured to be passed from the cavity of the container into the pastry bag after being deployed for mixing and dispensing of the baked good ingredients from the pastry bag.

2. The dispensing baked good container assembly of claim 1, wherein the container is rigid and the pastry bag is flexible.

3. The dispensing baked good container assembly of claim 1, wherein the pastry bag is folded up when packed and unfolded when deployed.

4. The dispensing baked good container assembly of claim 1, wherein the pastry bag is initially packed in the second end of the container below the baked good ingredients such that the baked good ingredients are initially contained in the container and not in the pastry bag.

5. The dispensing baked good container assembly of claim 1, wherein the baked good ingredients are initially loaded into the pastry bag and then the pastry bag with the baked good ingredients are received in the cavity, the pastry bag with the baked good ingredients being configured to be deployed from the container after the container is opened.

6. The dispensing baked good container assembly of claim 1, wherein the container includes sides between the first end and the second end, the pastry bag being attached to the sides.

7. The dispensing baked good container assembly of claim 1, wherein the container includes an edge at the second end, the dispensing baked goods container further comprising a base coupled to the edge.

8. The dispensing baked good container assembly of claim 7, wherein the pastry bag is coupled to the base and located in the base when packed in the container.

9. The dispensing baked good container assembly of claim 7, wherein the base is a molded cap coupled to the container at the second end, the molded cap including a removable foil seal below the pastry bag, the pastry bag being accessed for deployment when the foil seal is removed.

10. The dispensing baked good container assembly of claim 7, wherein the base is a removable foil seal coupled to the edge and located below the pastry bag, the pastry bag being accessed for deployment when the foil seal is removed.

11. The dispensing baked good container assembly of claim 1, further comprising a molded cap at the second end of the container, the molded cap holding the pastry bag in the cavity, the molded cap being removable from the container to allow the pastry bag to deploy from the second end of the container.

12. The dispensing baked good container assembly of claim 1, wherein the container includes a removable lid at the first end.

13. The dispensing baked good container assembly of claim 1, wherein the pastry bag has a conical lower end.

14. The dispensing baked good container assembly of claim 1, wherein the pastry bag has a bulbed section proximate to a top of the pastry bag.

15. The dispensing baked good container assembly of claim 1, wherein the pastry bag remains coupled to the container when deployed during mixing and dispensing of the baked good ingredients.

16. The dispensing baked good container assembly of claim 1, wherein the pastry bag is configured to receive water through the first end of the container for mixing with the baked good ingredients.

17. The dispensing baked good container assembly of claim 1, wherein the pastry bag is adhered to the container.

18. The dispensing baked good container assembly of claim 1, wherein the pastry bag includes an interior surface and an exterior surface, the pastry bag having an opening at a top of the pastry bag defined by the interior surface configured to receive the baked good ingredients from the cavity when the pastry bag is deployed, the exterior surface at the top of the pastry bag being sealed to the container.

19. The dispensing baked good container assembly of claim 1, wherein the pastry bag is initially packed in the first end of the container above the baked good ingredients such that the baked good ingredients are initially contained in the container and not in the pastry bag.

20. The dispensing baked good container assembly of claim 1, further comprising a molded cap at the first end of the container, the molded cap holding the pastry bag in the cavity, the molded cap being removable from the container to allow the pastry bag to deploy from the first end of the container.

21. A dispensing baked good container assembly comprising:
    a container having a first end and a second end, the container having a cavity configured to hold baked good ingredients, the container configured to be opened;
    a lid at the first end of the container configured to be opened to access the cavity;
    a base removably coupled to the second end of the container; and
    a pastry bag coupled to the container, the pastry bag being initially packed in the second end of the container and configured to be contained below the baked good ingredients, the pastry bag configured to be deployed after the base is removed, the pastry bag being open to the container such that the baked good ingredients are configured to be transferred from the cavity of the container into the pastry bag through the second end of the container after the pastry bag is deployed for mixing and dispensing of the baked good ingredients from the pastry bag.

22. A method of manufacturing a dispensing baked good container assembly, the method comprising:
providing a container having a cavity configured to hold baked good ingredients;
coupling a pastry bag to the container; and
packing the pastry bag into the container such that the cavity is configured to receive the baked good ingredients and the packed pastry bag, wherein the pastry bag is configured to be deployed below the container to hold the baked good ingredients in the pastry bag below the container for mixing and dispensing of the baked good ingredients from the pastry bag.

23. The method of claim 22, wherein said packing the pastry bag comprises folding the pastry bag such that the pastry bag is configured to be unfolded when deployed to fill with the baked good ingredients.

24. The method of claim 22, further comprising filling the container with the baked good ingredients above the packed pastry bag.

25. The method of claim 22, wherein said coupling the pastry bag comprises coupling the pastry bag to sides of the container proximate to the second end of the container.

26. The method of claim 22, further comprising coupling a base to the container, the base containing the pastry bag.

27. The method of claim 22, further comprising coupling a removable foil seal below the pastry bag configured to be removed to access the pastry bag to deploy the pastry bag.

28. The method of claim 22, further comprising coupling a removable lid to a first end of the container, the pastry bag being coupled to at least one of the removable lid or the container.

29. The method of claim 22, wherein said coupling the pastry bag to the container comprises coupling a necked section of the pastry bag to the container.

30. The method of claim 22, wherein said coupling the pastry bag to the container comprises coupling a top of the pastry bag to the container such that an opening at the top of the pastry bag is configured to receive the baked good ingredients through the second end of the container.

31. The method of claim 22, wherein said coupling the pastry bag to the container comprises adhering the pastry bag to the container.

32. The method of claim 22, wherein said coupling the pastry bag to the container comprises coupling an interior surface of the pastry bag to an exterior surface of the container.

33. The method of claim 22, wherein said coupling the pastry bag to the container comprises coupling an exterior surface of the pastry bag to an interior surface of the container.

34. The method of claim 22, further comprising filling the container with the baked good ingredients below the packed pastry bag.

35. The method of claim 22, wherein said coupling the pastry bag to the container comprises coupling the pastry bag to a base and coupling the base to the container.

36. A method of manufacturing a dispensing baked good container assembly, the method comprising:
loading baked good ingredients into a cavity of a container on top of a packed pastry bag located at the second end of the container, wherein at least some of the baked good ingredients are loaded into the container; and
sealing the container with the baked good ingredients in the cavity on top of the packed pastry bag, wherein the container is configured to be unsealed to deploy the pastry bag in such a way that the ingredients are configured to be transferred directly from the cavity into the deployed pastry bag for mixing and dispensing of the baked good ingredients from the pastry bag.

37. The method of claim 36, wherein said loading baked good ingredients comprises loading baked good ingredients on top of a packed pastry bag located on top of a removable foil configured to be removed from the container.

38. The method of claim 36, wherein said loading baked good ingredients comprises loading dried baked good ingredients into the container.

39. The method of claim 36, wherein said sealing the container comprises coupling a lid to a first end of the container.

40. The method of claim 36, wherein said loading baked good ingredients comprises loading baked good ingredients into the cavity through an open end of the container and containing the baked good ingredients in the cavity by a closed end of the container opposite the open end of the container and side walls of the container between the open end and the closed end of the container, said sealing the container comprises coupling a base to the open end of the container, the base including the pastry bag.

41. A method of dispensing baked good ingredients from a dispensing baked good container assembly that includes a container having a cavity holding baked good ingredients and a pastry bag, the pastry bag being coupled to the container and being initially packed in the container, the method comprising:
removing a base from the container to expose the packed pastry bag;
deploying the pastry bag below the container;
emptying the baked good ingredients from the cavity with the attached pastry bag;
mixing the baked good ingredients in the pastry bag; and
dispensing the baked good ingredients from the pastry bag.

42. The method of claim 41, wherein said removing a base comprises removing a foil seal from the container.

43. The method of claim 41, wherein said emptying the baked good ingredients from the cavity with the attached pastry bag comprises pre-loading the baked good ingredients into the pastry bag and deploying the pastry bag with the pre-loaded baked good ingredients from the container.

44. The method of claim 41, wherein said removing a base comprises removing a molded cap from the container.

45. The method of claim 41, wherein said deploying the pastry bag comprises unfolding the pastry bag.

46. The method of claim 41, wherein said deploying the pastry bag is caused by emptying the baked good ingredients from the cavity into the pastry bag.

47. The method of claim 41, further comprising pouring water into the pastry bag through the container, said mixing the baked good ingredients comprises mixing the baked good ingredients with the water.

48. The method of claim 41, wherein said dispensing the baked good ingredients comprises squeezing the mixed baked good ingredients through an opening at a bottom of the pastry bag.

49. A method of manufacturing a dispensing baked good container assembly, the method comprising:
loading baked good ingredients into a cavity of a container under a packed pastry bag located at a first end of the container, wherein at least some of the baked good ingredients are loaded into the container; and
sealing the container with the baked good ingredients in the cavity under the packed pastry bag, wherein the container is configured to be unsealed to deploy the pastry bag in such a way that the ingredients are configured to be transferred directly from the cavity into the deployed pastry bag for mixing and dispensing of the baked good ingredients from the pastry bag.

50. A dispensing baked good container assembly comprising:
- a container having a cavity configured to hold baked good ingredients, the container having an open first end and a closed second end;
- a base coupled to the first end of the container, the base having a removable lid; and
- a pastry bag coupled to the base, the pastry bag being initially packed in at least one of the base and the cavity of the container and configured to be contained above the baked good ingredients, the pastry bag configured to be deployed after the lid is removed, the pastry bag being open to the container such that the baked good ingredients are configured to be transferred from the cavity of the container into the pastry bag through the first end of the container after the pastry bag is deployed for mixing and dispensing of the baked good ingredients from the pastry bag.

* * * * *